United States Patent [19]

Kishino

[11] 3,816,747
[45] June 11, 1974

[54] METHOD AND APPARATUS FOR MEASURING LATTICE PARAMETER

[75] Inventor: Seigo Kishino, Hachioji, Japan
[73] Assignee: Hitachi, Ltd., Tokyo, Japan
[22] Filed: May 30, 1972
[21] Appl. No.: 257,554

[52] U.S. Cl. ................ 250/276, 250/273, 250/278
[51] Int. Cl. ............................................ G01n 23/00
[58] Field of Search .......... 250/51.5, 276, 273, 278

[56] References Cited
UNITED STATES PATENTS
2,843,749   7/1958   Koblenz .......................... 250/51.5

OTHER PUBLICATIONS
"Elements of X-Ray Diffraction" – Cullity Addison–Wesley, 1956; pp. 6, 7, 85, 86.

Primary Examiner—Archie R. Borchelt
Assistant Examiner—B. C. Anderson
Attorney, Agent, or Firm—Craig & Antonelli

[57] ABSTRACT

Two characteristic X-ray beams are irradiated on a specimen for detection (a specimen crystal), the difference $\Delta\Theta$ between the Bragg angles of the two characteristic X-ray beams diffracted from the specimen crystal is measured, and the lattice parameter $d$ of the specimen crystal is calculated from the relational equation:

$$d = \frac{1}{2}\left[\lambda_1^2 + \left(\frac{\lambda_2 - \lambda_1 \cos \Delta\Theta}{\sin \Delta\Theta}\right)^2\right]^{1/2}$$

In comparison with a prior-art method which evaluates the lattice parameter from the Bragg diffraction condition, the lattice-parameter measuring method of this invention may eliminate the difficulty of the zero-point setting at measuring Bragg diffraction angles and renders angles to-be-measured small, so that the measurement accuracy of the lattice parameter may be enhanced.

28 Claims, 10 Drawing Figures

Si WAFER OF B.(3×10^15) DOPE

FIG. 8

Si WAFER OF B.(5×10^18) DOPE

FIG. 9
Si WAFER OF B.(3×10¹⁹) DOPE

FIG. 10
Si WAFER OF B.(2×10²⁰) DOPE

METHOD AND APPARATUS FOR MEASURING LATTICE PARAMETER

BACKGROUND OF THE INVENTION

1. Field of the Invention

The present invention relates to methods and apparatus for measuring the lattice parameter of a crystal with the X-ray diffraction.

2. Description of the Prior Art

As is well known, a prior-art measurement of a lattice parameter with X-ray diffraction techniques has been conducted such that, using an X-ray diffractometer or the like, the Bragg angle $\Theta_B$ of X-ray diffraction by an arbitrary crystal plane of a crystal is measured, and the lattice parameter or constant $d$ of the crystal is calculated from the relation of $2d\sin\Theta_B=\lambda$, where $\lambda$ represents the wavelength of the X-ray. In order to increase the precision of the measurement of the Bragg angle, by way of example, enhancement of the degree of parallelism of the employed X-ray beams has been effected by the double crystal process.

While the prior-art method utilizes the measured value of the Bragg angle itself as described above, it is extremely difficult in the measurement to accurately set the position of the zero point. In order to enhance the precision of the Bragg angle measurement, it is necessary to use a Bragg angle of large value. However, it is most difficult to effectively attain a measurement down to minutes or seconds in an angle of several tens of degrees.

SUMMARY OF THE INVENTION

An object of the present invention is to provide a method for measuring a lattice parameter which is free from the above-mentioned difficulties attendant upon the Bragg angle measurement in the calculation of the lattice parameter of a crystal with the X-ray diffraction.

A further object of the present invention is to provide an apparatus for measuring a lattice parameter which meets the above measurement of the lattice parameter.

The subject matter of the present invention consists in that X-rays beams including a set of characteristic X-ray beams for example $K\alpha_1$ and $K\beta_1$ rays) are irradiated on a specimen crystal, the crystal is rotated to successively generate diffractions of the $K\alpha_1$ and $K\beta_1$ rays due to an identical lattice plane, a difference in the rotational angle between both diffractions is measured, and the lattice parameter is calculated from equations referred to hereinbelow by the use of the difference.

Furthermore, the following method for measuring a lattice parameter which improves upon the above method is the subject matter of the present invention. The improved method for measuring a lattice parameter consists in that a set of characteristic X-ray beams ($K\alpha_1$ and $K\beta_1$ rays) are diffracted by an identical lattice plane of a standard crystal, the lattice parameter of which is known beforehand, that the diffracted $K\alpha_1$ and $K\beta_1$ rays are irradiated on a specimen crystal resembling the standard crystal, and that they are diffracted by the same lattice plane as in the above. Since both the $K\alpha_1$ and $K\beta_1$ rays impinge upon the lattice plane of the specimen crystal in directions very close to the Bragg angle, the improved measuring method may diffract the $K\alpha_1$ and $K\beta_1$ rays at an angular difference in the order of seconds when the specimen crystal is rotated. The method measures a small difference of two Bragg angles of $K\alpha_1$ and $K\beta_1$ rays, adds to the measured value a difference of of Bragg angles of $K\alpha_1$ and $K\beta_1$ rays in the standard crystal, to thereby obtain a difference of Bragg angles in the specimen crystal, and calculates the lattice parameter using it. According to the method, the angular difference to be measured is in the order of seconds, so that a measurement with extremely high precision and, accordingly, an exact determination of the lattice parameter is afforded.

The basic principle of the lattice-parameter measuring method of the present invention as described above will now be discussed. Let it be supposed that a specimen crystal induces diffraction for a characteristic X-ray beam of wavelength $\lambda_1$ in a set of irradiated characteristic X-ray beams, and that the Bragg angle is $\Theta_1$. Then, $$2d\sin\Theta_1=\lambda_1 \qquad 1.$$

Next, if the Bragg angle of a diffracted X-ray beam induced by the other characteristic X-ray beam (wavelength $\lambda_2$) is represented by $\Theta_1+\Delta\Theta$, then $$2d\sin(\Theta_1+\Delta\Theta)=\lambda_2 \qquad 2.$$

Therefore, a lattice parameter $d$ satisfying equations (1) and (2) becomes $$d=\frac{1}{2}\left[\lambda_1^2+\left(\frac{\lambda_2-\lambda_1\cos\Delta\Theta}{\sin\Delta\Theta}\right)^2\right]^{1/2}$$

Therefore, if the $\Delta\Theta$ between the Bragg Diffraction angles of the set of characteristic X-ray beams diffracted from the specimen crystal is measured, the lattice parameter $d$ of the specimen crystal may be calculated by equation (3). Herein, "a set of characteristic X-ray beams" shall means two characteristic X-ray beams of different wavelengths which are successively radiated from an X-ray source. It is usually desirable from the viewpoint of the diffraction intensity that any two of $K\alpha_1$, $K\alpha_2$ and $K\beta_1$ are used for the set of characteristic X-ray beams to-be-irradiated.

The present invention diffracts the set of characteristic X-ray beams by means of the specimen crystal in succession, and measures the difference in the Bragg diffraction angle between the two characteristic X-ray beams diffracted from the specimen crystal, whereby the lattice parameter of the specimen crystal using said difference can be calculated. The zero-point setting for evaluating the angular difference is therefore unnecessary. Since the angular difference is approximately 5° in usual cases, the angular difference to be measured is extremely small and is precisely attained down to the orders of minutes and seconds in spite of the fact that large Bragg angles are employed. The precision of the lattice parameter obtained is therefore high.

DESCRIPTION OF THE PREFERRED EMBODIMENTS

EMBODIMENT 1

Figures 1, 2, 3, 4:
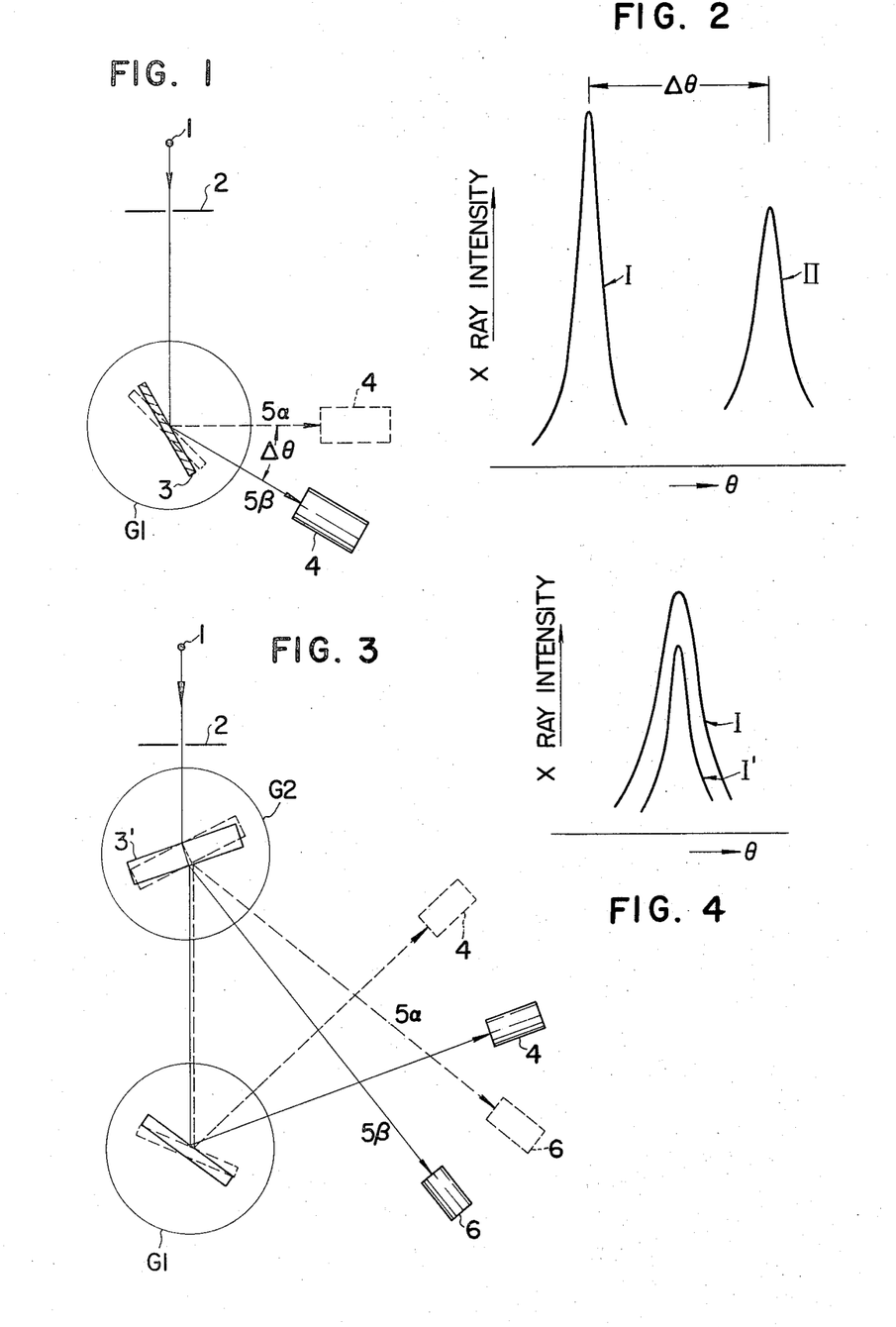
FIG. 1 is a principle diagram showing an embodiment of the lattice parameter measuring method of the present invention.
FIG. 2 shows profiles illustrating the relation in the intensity of diffracted X-rays between two characteristic X-ray beams as measured by the lattice parameter measuring method in FIG. 1.
FIG. 3 is a principle diagram showing another embodiment of the lattice parameter measuring method of the present invention.
FIG. 4 is a diagram showing profiles of the intensity of a diffracted X-ray beam as measured by the lattice parameter measuring method illustrated in FIG. 3 and the intensity of the diffracted X-ray beam as obtained by the lattice parameter measuring method illustrated in FIG. 1, both the profiles being of the $K\alpha_1$ rays.

As shown in FIG. 1, the center of an X-ray beam, exiting a slit 2 narrow enough to separate $K\alpha_1$ and $K\alpha_2$ after diffraction from among X-ray beams radiated from an X-ray source 1, irradiates a specimen crystal 3 which is arranged so that its crystal surface may coincide with the rotary axis of a goniometer G1. Subsequently, while rotating the specimen crystal 3, the peak profile of a diffracted ray $5\alpha$ of $K\alpha_1$ is depicted using a counter 4 which is concentric with the above-mentioned rotary axis. Then, a profile as shown by a curve I in FIG. 2 is obtained.

Further, the specimen crystal 3 is subsequently rotated e.g., in the clockwise direction, and the peak profile of a diffracted ray $5\beta$ of $K\beta_1$ is depicted. Then, a peak profile as shown by a curve II in FIG. 2 is obtained. The angular difference $\Delta\Theta$ between the peaks (diffracted X-ray intensities) of the curves I and II at this time is read in the unit of seconds, and the lattice parameter $d$ may be calculated by equation (3).

EMBODIMENT 2

A disadvantage of the embodiment 1 is that, since the intensity profiles of the characteristic X-ray beams as a function of the rotated angle of the specimen are depicted, the half-width of each peak profile is spread due to the influence of the natural width (approximately 2 minutes) of the characteristic X-ray beam, hence $\Delta\Theta$ is prone to include a reading error. The present inventor has found that the measurement accuracy may be more enhanced by utilizing the anomalous transmission effect (also termed the Borrmann effect) of X-rays.

The anomalous transmission effect is a phenomenon in which, in case of transmitting X-rays through a perfect crystal, attenuation which is expected with the normal absorption coefficient is not exhibited, by X-rays of very good parallelism are transmitted without considerable attenuation. This is considered to be attributable to the fact that, among the incident X-rays, those strictly satisfying Bragg reflection are propagated along the lattice plane of the crystal without being substantially absorbed, and that they are divided into two directions of transmitted X-rays and diffracted X-rays after coming out of the crystal. In this case, however, unless the product $\mu t$ between the thickness $t$ and the linear absorption coefficient $\mu$ of the crystal is sufficiently greater than 1 (one), the anomalous transmission effect is not satisfactory. In addition, if there is a part of a lattice defect in the crystal at which the condition of the Bragg reflection is not met, it is difficult for the X-rays to be transmitted therethrough, so as to weaken the transmitted intensity of the X-rays. It is therefore, necessary that the crystal employed is one having the fewest possible lattice defects and being nearly perfect.

In the present embodiment, the foregoing anomalous transmission effect of X-rays in a crystal is utilized. FIG. 3 is a diagram for explaining the principle of apparatus applying this method.

Referring to the figure, the differences from embodiment 1 are that a second goniometer G2 is provided between the slit 2 and the gonimeter G1, that a crystal 3' for anomalous transmission is placed on the second goniometer G2 in a manner for the crystal surface to coincide with the rotary axis thereof, and that a counter 6 rotatable around the second goniometer G2 is provided in a manner to be concentric therewith.

First, the incident characteristic X-rays are the $K\alpha_1$ ones, and the counter 6 is set in the direction of the Bragg angle of the X-rays due to the crystal 3'. Thereafter, the second goniometer G2 is rotated, and adjusted so that diffracted rays $5\alpha$ of the incident X-rays $K\alpha_1$ may fall on the counter 6. Thus, the crystal 3' and the incident characteristic X-rays $K\alpha_1$ satisfy the condition of anomalous transmission, so that anomalous transmission X-rays parallel to the incident X-rays emanate from a position at which rays $5\alpha'$, diffracted by the crystal 3', appear.

The anomalous transmission X-rays are irradiated on the specimen crystal 3 as in the case of FIG. 1, and the intensity profile of their diffracted rays is measured by means of the counter 4. Subsequently, the counter is adjusted to the direction of diffracted rays $5\beta'$ of the $K\beta_1$ rays, and a procedure similar to the above is conducted, to seek for the profile of diffracted rays of $K\beta_1$ due to the specimen crystal 3. The peak-to-peak distance $\Delta\Theta$ of both the profiles may be evaluated as in the embodiment 1.

The peak profile of the diffracted $K\alpha_1$ rays evaluated by the above method is shown at a curve I' in FIG. 4. The curve I is a peak profile according to the embodiment 1.

It is apparent from the figure that the peak profile according to the embodiment 2 is sharper than that according to the embodiment 1, to enhance the measurement precision of $\Delta\Theta$.

EMBODIMENT 3

Figure 5:
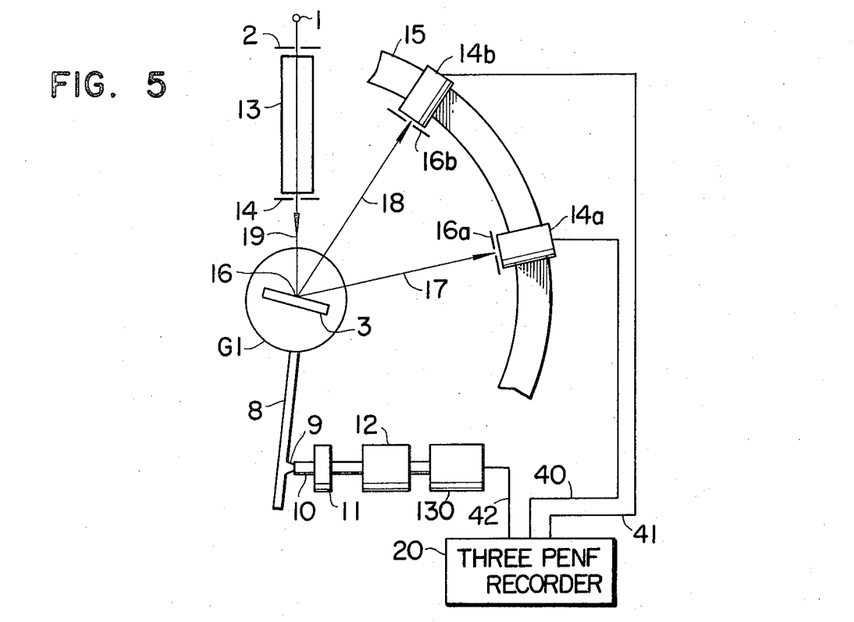
FIG. 5 is a plan view of an embodiment of the lattice parameter measuring apparatus of the present invention.

Shown in FIG. 5 is a schematic plan view containing electric connections of the present invention. Referring to the figure, a goniometer head G1 is arranged in the path of an X-ray beam 19 radiated from an X-ray source 1 and converged by a slit 2, a pipe 13 and a slit 14. A specimen crystal 3 is disposed at the position of the rotary center of the goniometer head, and is subjected to the irradiation of the X-ray beam 19. A set of X-ray detectors 14a and 14b are slidable mounted on a gliding table 15 which is provided with graduations in the unit of degrees. The detectors 14a and 14b are fixed at positions defining an angle which is twice as large as an angle which is previously expected to be defined as the Bragg angle for an arbitrary and specified lattice plane of the crystal 3 by two sorst of characteristic X-rays in the X-ray beam 19. To a mechanism in the form of a sine bar composed of a bar 8 coupled to the goniometer head G1, a pivot 9, and a rotary shaft of the goniometer head G1, there are successively coupled screw mechanisms 10 and 11 for converting a rotation into a reciprocating motion, a rotational-speed reducing gear mechanism 12, and a pulse motor 130, to constitute a mchanism for allowing a rotation of a small angle for the specimen crystal. The sine bar mechanism imparts a uniformly smooth and accurate rotation within a range of small-angle rotations. Further, the use of the pulse motor as the rotational source may control the rotational speed over a wide range and at high precision by electric signals and, therewith, it may present signals indicating the amounts of rotations. The output ends of the X-ray detectors 14a and 14b and the pulse input end of the pulse motor 130 are connected to a three-pen recorder 20 by lead wires 40, 41 and 42, respectively.

In front of the detectors 14a and 14b, slits 16a and 16b are respectively provided to eliminate X-ray doublets.

With the above construction, the specimen crystal 3 is initially rotated to set a state in which two types of characteristic X-rays in the X-ray beam 19 are diffracted at an identical lattice plane or different lattice planes of the crystal 3, their diffracted rays 17 and 18 being respectively detected by the X-ray detectors 14a and 14b. The pulse motor 130 is driven to impart a rotation of a small angle to the specimen crystal 3. Then, as the specimen is rotated, intensity variations of both diffracted X-rays, i.e., the profiles of the diffracted rays, are simultaneously recorded in the recorder 20 through the detectors 14a and 14b, while the pulse signals indicating the amount of the rotation of the small angle are also recorded. The distance between the peak values of both the profiles obtained at this time is read from the amount of the rotation, and a strict difference $\Delta\Theta$ in the Bragg angle is determined from this value. More specifically, when an identical lattice plane is used, $\Delta\Theta$ is equal to the amount of the rotation. On the other hand, when different lattice planes are used, $\Delta\Theta$ is equal to the difference or sum between the amount of the rotation and inclinations of the lattice planes.

The lattice constant or parameter $d$ is determined using $\Delta\Theta$ and by the following equation:

$$d = \frac{1}{2}\left[\lambda_1^2 + \left(\frac{\lambda_2 - \lambda_1 \cos \Delta\Theta}{\sin \Delta\Theta}\right)^2\right]^{1/2}$$

where $\lambda_1$ and $\lambda_2$ represent the respective wavelengths of the two sorts of characteristic X-rays.

EMBODIMENT 4

Figure 6:
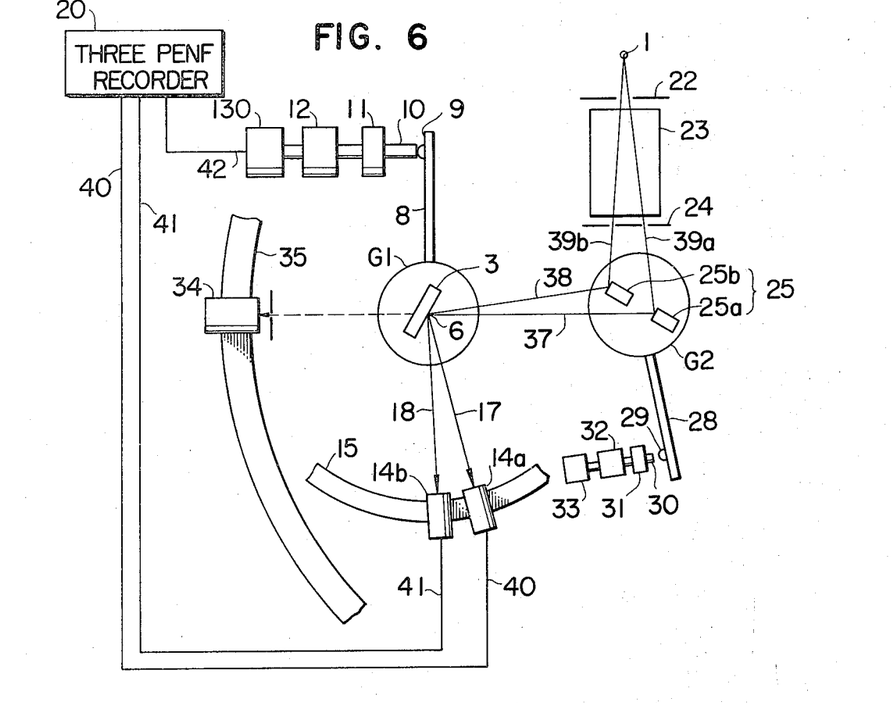
FIG. 6 shows a plan view of another embodiment of the lattice parameter measuring apparatus of the present invention.
Figure 7:
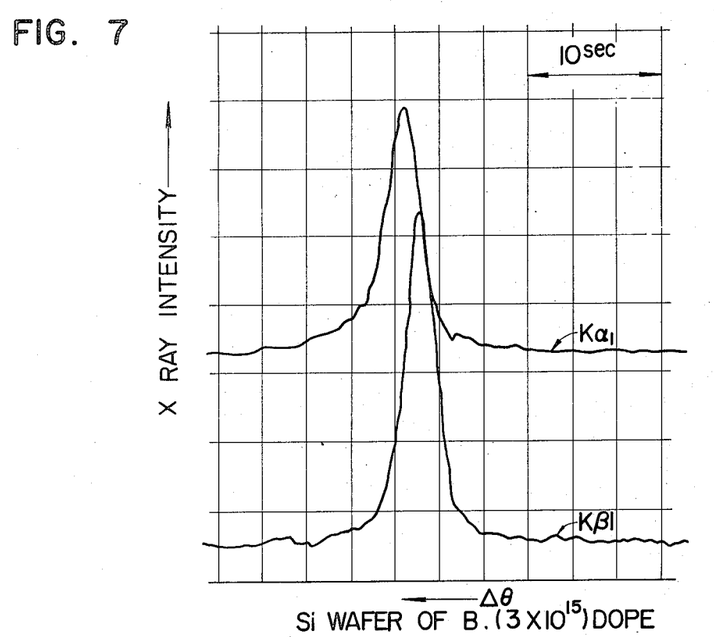
FIGS. 7 to 10 are profiles showing the relation of the $K\alpha_1$ and $K\beta_1$ rays between differences in the Bragg diffraction angle and diffracted X-ray intensities with regard to silicon crystals which are respectively doped with boron at $3 \times 10^{15}/cm^3$, $5 \times 10^{18}/cm^3$, $3 \times 10^{19}/cm^3$, and $2 \times 10^{20}/cm^3$, the profiles being measured by the lattice parameter measuring apparatus in FIG. 6.
Figure 8:
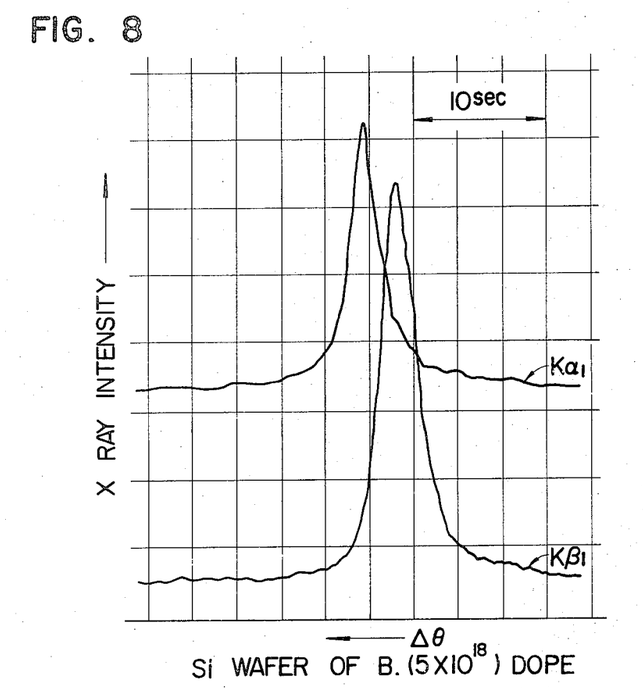
Figure 9:
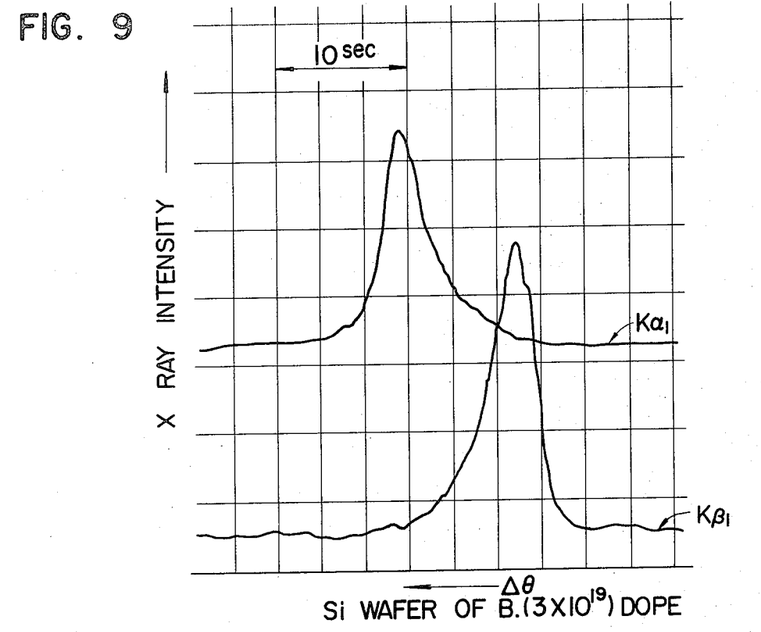
Figure 10:
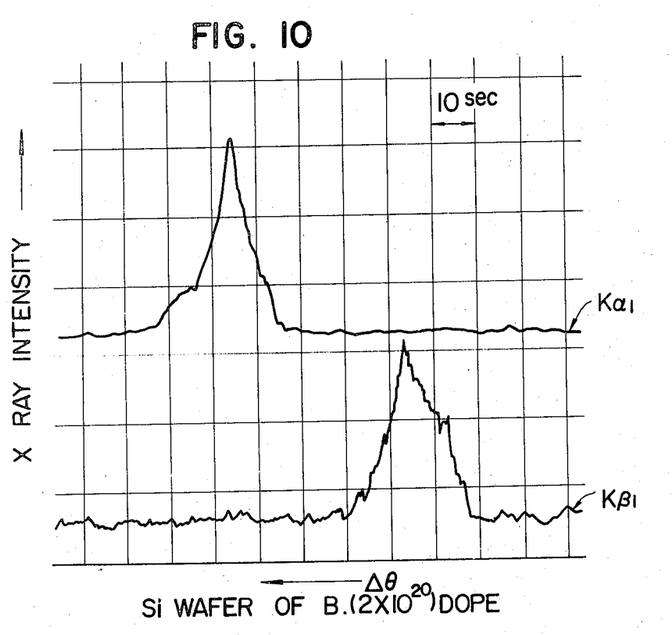

FIG. 6 is a schematic plan view containing electric connections of another embodiment of the present invention. Referring to the figure, a divergent X-ray beam radiated from an X-ray source 1 and passing through a slit 22 and a pipe 23 is separated into two X-rays beams 39a and 39b by means of a slit 24 with two holes. A goniometer head G2 for supporting a standard crystal is arranged in the paths of both the X-rays beams 39a and 39b inpinge on both side parts 25a and 25b of the groove, respectively. To a sine bar mechanism composed of a bar 28 coupled to the goniometer head G2, a pivot 29, and a rotary shaft of the goniometer head G2, there are successively coupled screw mechanisms 30 and 31 for converting a rotation into a reciprocating motion, a rotational-speed reducing mechanism 32, and a pulse motor 33, to constitute means for small-angle rotations of the standard crystal 25. On a plane in which the X-ray beams 39a and 39b diffracted by the crystal 25 are propagated, a gliding table 35 is provided. An X-ray detector 34 is slidably mounted on the table 35, and detects the diffracted X-rays from the standard crystal 25. The bearings of the standard crystal 25 is finely adjusted by the small-angle rotation means as well as the X-ray detector 34, so as to provide a bearing in which a characteristic X-ray beam 37 diffracted by the crystal part 25a and another characteristic X-ray beam 38 diffracted by the crystal part 25b are simultaneously generated. The standard crystal is fixed in the bearing.

A goniometer head G1 is arranged with its rotary axis 6 brought to a position at which both the diffracted characteristic X-ray beams 37 and 38 intersect. A specimen crystal 3 is disposed on the goniometer head G1, and the characteristic X-ray beams 37 and 38 are irradiated thereon.

To a sine bar mechanism made up of a bar 8 coupled to the goniometer head G1, a pivot 9, and a rotary shaft of the goniometer head G1, there are successively coupled screw mechanisms 10 and 11 for converting rotation into reciprocating motion, a rotational-speed reducing gear mechanism 12, and a pulse motor 130, to constitute means to rotate the specimen crystal 3 over a small angle. In a plane in which both the characteristic X-ray beams 37 and 38 diffracted by the specimen crystal 3 are propagated, a gliding table 15 is provided. A set of X-ray detectors 14a and 14b are slidably mounted on the gliding table 15. The detectors 14a and 14b are fixed on the gliding table in approximate directions in which the characteristic X-ray beams 37 and 38 are expected to be diffracted by a lattice plane of the specimen crystal 3 being of the same kind as the diffracting lattice plane of the standard crystal 25. The output ends of the X-ray detectors 14a and 14b and the pulse signal input end of the pulse motor 130 are connected to a three-pen recorder 20 by lead wires 40, 41 and 42, respectively.

With the construction, the specimen crystal 3 is previously rotated to set a state in which two types of diffracted characteristic X-ray beams 17 and 18 are respectively detected by the X-ray detectors 14a and 14b.

When the pulse motor 130 is driven to subject the specimen crystal 3 to a rotation of a small angle, the diffracted ray profiles of both the characteristic X-ray beams by the specimen crystal and electric signals indicating the amount of the rotation are simultaneously recorded along with the rotation. The distance between the peak values of both the profiles may be accurately read in the form of the amount of the rotation by the electric signals.

The amount of the rotation $\delta\Theta$ indicates the difference between a difference $\Delta\Theta s$ in the Bragg angles of the two types of characteristic X-ray beams with respect to an arbitrary lattice plane and the corresponding difference $\Delta\Theta$ in the Bragg angles with respect to a lattice plane of the specimen crystal which is of the same kind, and they have the relation of $\Delta\Theta = \Delta\Theta s + \delta\Theta$.

In other words, the above embodiment cancels $\Delta\Theta$ by $\Delta\Theta s$, thus making the value $\delta\Theta$ to-be-measured small.

As described above, the present invention is used for the determination of the lattice parameter by the Bragg angle difference $\Delta\Theta$. In cases where the standard crystal and the specimen crystal have an extreme resemblance in the above embodiment, $\delta\Theta$ is in the order of seconds, and $\Delta\Theta$ is determined extremely precisely with respect to $\Delta\Theta s$ of the standard crystal.

Both the foregoing embodiments 3 and 4 and referred to an example in which the pulse motor is used as the means to drive the rotation, and in which the amount of a rotation of a small angle is indicated by pulses applied to the motor. In the case, however, where the recording-paper feed speed of the recorder is constant and a sharp deceleration of the rotation of the motor is precisely performed, thus allowing the small-angle retation of the specimen crystal and the feed of the recording paper to precisely performed, thus allowing the small-angle rotation of the specimen crystal and the feed of the recording paper to precisely correspond, the amount of the small-angle rotation may be measured in the form of the peak-to-peak distance on the recording paper by employing a synchronous motor in place of the pulse motor. $\Delta\Theta$ thus measured is substituted into the equation:

$$d = \frac{1}{2}\left[\lambda_1^2 + \left(\frac{\lambda_2 - \lambda_1 \cos \Delta\Theta}{\sin \Delta\Theta}\right)^2\right]^{1/2}$$

and thereby, the lattice parameter may be determined.

The foregoing embodiments 3 and 4 comprise two X-ray detectors which simultaneously detect the diffractions of the two types of characteristic X-ray beams due to the specimen crystal, and the means to impart a precise small-angle rotation to the specimen crystal, whereby the diffraction profiles of both the characteristic X-ray beams are simultaneously recorded, and the difference between the Bragg angles of the two types of characteristic X-ray beams with respect to the diffracting lattice plane of the specimen crystal is presented at high precision. The angular difference has a much higher precision than the Bragg angle itself presented by prior-art apparatus, and an extra-ordinarily precise determination of the lattice parameter is provided. In case of the measurement of the embodiment 4, the X-ray beams 37 and 38 respectively diffracted by the standard Si crystals 25a and 25b are focused on the surface of the Si crystal 3 to measure the lattice parameter, and the X-ray beams further diffracted from the specimen Si crystal are respectfully detected by the X-ray detectors 14a and 14b. Outputs obtained at the X-ray detectors 14a and 14b, and outputs with which the rotational angles $d\Theta$ of the Si crystal 3 to-be-detected rotated in case of obtaining the former outputs are recorded in an X-Y recorder, and the results are illustrated in FIG. 7, FIG. 8, FIG. 9 and FIG. 10. In the figures, the curves are characteristic curves of the incident $K\alpha_1$ and $K\beta_1$ rays. The characteristic curves represent the relative outputs of the characteristic X-rays $K\alpha_1$ and $K\beta_1$ of the Si crystal to-be-detected in cases where the concentrations of impurities (boron) contained in the Si crystal to-be-detected are $3 \times 10^{15}/cm^3$, $5 \times 10^{18}/cm^3$, $3 \times 10^{19}/cm^3$ and $2 \times 10^{20}/cm^3$, respectively. From the measured results, the lattice parameters of the Si crystals are as below:

1. Lattice parameter of Si crystal doped with $3 \times 10^{15}/cm^3$ of boron:
   $d = 5.4307 \pm 0.00005$
2. Lattice parameter of Si crystal doped with $5 \times 10^{18}/cm^3$ of boron:
   $d = 5.4306 \pm 0.00005$
3. Lattice parameter of Si crystal doped with $3 \times 10^{19}/cm^3$ of boron:
   $d = 5.4300 \pm 0.00005$
4. Lattice parameter of Si crystal doped with $2 \times 10^{20}/cm^3$ of boron:
   $d = 5.4268 \pm 0.00005$ In principle, however, the measurement accuracy may be increased to the order of $10^{-6} - 10^{-7}$.

What is claimed is:

1. A method for measuring a lattice parameter of a crystal, comprising the steps of:

focusing two types of characteristic X-rays diffracted from two standard crystals which have a lattice parameter approximate to said lattice parameter of a specimen crystal, upon a surface of said specimen crystal;

measuring the difference $\Delta\Theta$ between the Bragg diffraction angles of the diffracted rays of said two types of characteristic X-rays diffracted by said specimen crystal; and determining the lattice parameter $d$ of said specimen crystal in conformity with the equation:

$$d = \frac{1}{2}\left[\lambda_1^2 + \left(\frac{\lambda_2 - \lambda_1 \cos \Delta\Theta}{\sin \Delta\Theta}\right)^2\right]^{1/2}$$

where $\lambda_1$ and $\lambda_2$ represent the wavelengths of said two types of characteristic X-rays.

2. A method for measuring a lattice parameter of a crystal according to claim 1, wherein said two standard crystals are two parts of the standard crystal which has a lattice parameter approximate to said lattice parameter of the specimen crystal.

3. A method for measuring a lattice parameter of a crystal, comprising the steps of: 'focusing two types of characeristic X-rays diffracted from two standard crystals which have a lattice parameter approximate to said lattice parameter of a specimen crystal, upon a surface of said specimen crystal;

measuring peak profiles of diffracted rays of two types of characteristic X-rays diffracted by said specimen crystal and attendant upon a rotation of said specimen crystal, to evaluate a difference $\Delta\Theta$ between the Bragg diffraction angles of both said diffracted rays; and thereafter, determining the lattice parameter d of said specimen crystal in conformity with the equation:

$$d = \frac{1}{2}\left[\lambda_1^2 + \left(\frac{\lambda_2 - \lambda_1 \cos \Delta\Theta}{\sin \Delta\Theta}\right)^2\right]^{1/2}$$

where $\lambda_1$ and $\lambda_2$ represent the wavelengths of said two types of characteristic X-rays.

4. A method for measuring a lattice parameter of a crystal according to claim 3, wherein said two standard crystals are two parts of the standard crystal which has a lattice parameter approximate to said lattice parameter of said specimen crystal.

5. An apparatus for measuring a lattice parameter of a crystal comprising:

first means for supporting a specimen crystal;

second means for focusing two types of characteristic X-rays having first and second respective wavelengths $\lambda_1$ and $\lambda_2$ diffracted from two standard crystals which have a lattice parameter approximate to said lattice parameter of specimen crystal, upon a surface of said specimen crystal;

third means, coupled to one of said first and second means, for displacing said first and second means relative to each other; and fourth means, responsive to the rays diffracted by said specimen corresponding to said first and second wavelengths, for measuring the difference $\Delta\Theta$ between the Bragg angles of diffraction of the diffracted rays of said first and second wavelengths, whereby the lattice parameter d of said specimen crystal may be determined in accordance with the equation:

$$d = \frac{1}{2}\left[\lambda_1^2 + \left(\frac{\lambda_2 - \lambda_1 \cos \Delta\Theta}{\sin \Delta\Theta}\right)^2\right]^{1/2}$$

6. An apparatus for measuring a lattice parameter of a crystal according to claim 5, wherein said first means is a rotatable stand and said fourth means comprises:

a set of x-ray detectors which are slidably mounted on a gliding table and which are fixed in respective x-ray paths along which a set of wavelength components in said x-ray beam different from each other are propagated after said wavelength components are diffracted by an arbitrarily predetermiend identical lattice plane of the specimen crystal placed on said stand;

means to impart a rotation of a small angle to said stand through a sine bar mechanism which is coupled with said stand, whereby said specimen crystal is rotated over a small angle, to successively induce diffractions of said set of wavelength components; and a recorder connected to the outputs of said x-ray detectors for recording, simultaneously, the diffraction intensity profiles of the respective wavelength components, so that a small angular difference between the Bragg angles of the respective ones of said set of wavelength components for said lattice plane, said angular difference being a factor which determines said lattice parameter of said specimen crystal, may be precisely measured by the amount of rotation of a small angle between the peaks of said profiles.

7. An apparatus for measuring a lattice parameter of a crystal according to claim 6, further comprising:

a holder for a standard crystal disposd in a path of a divergent X-ray beam; and means to rotate said holder at a small angle, said means regulating the bearing of said holder so that a set of wavelength components in said divergent X-ray beam different from each other may be simultaneously diffracted and separated by said standard crystal, and wherein said specimen crystal placed on said rotatable stand is arranged at a position at which both the diffracted X-ray beams are received, whereby the difference between the Bragg angles of said set of wavelength components for said specimen crystal is cancelled by the difference between the corresponding Bragg angles for said standard crystal.

8. An apparatus according to claim 5, wherein said third means comprises means for changing the angle of incidence of each of said two types of X-rays on said specimen.

9. An apparatus according to claim 5, wherein said third means comprises means for effecting rotation of said specimen relative to said second means about an axis parallel to an axis passing through one of said specimen and second means.

10. An apparatus according to claim 5, wherein said fourth means comprises first and second X-ray detectors, displaceably disposed at first and second positions relative to said specimen, for detecting the diffracted X-rays therefrom.

11. An apparatus according to claim 5, wherein said two standard crystals of said second means are two parts of the standard crystal which has a lattice parameter approximate to the lattice parameter of said specimen crystal.

12. An apparatus according to claim 11, further including means for rotatably supporting said standard crystal relative to an axis parallel to an axis passing through said specimen.

13. An apparatus according to claim 12, wherein said fourth means comprises first and second X-ray detectors, displaceably disposed at first and second positions relative to said specimen, for detecting the diffracted X-rays therefrom.

14. An apparatus according to claim 11, further including a detector, displaceably disposed at a position relative to said specimen and said standard crystal for detecting diffracted X-rays from said standard crystal.

15. An apparatus according to claim 13, further including a third X-ray detector displaceable disposed at a third position relative to said specimen and said standard crystal.

16. An apparatus according to claim 11, wherein said third means comprises means for effecting rotation of said specimen relative to said second means about an axis parallel to an axis passing through one of said specimen and said standard crystal.

17. An apparatus according to claim 15, wherein said third means comprises means for effecting rotation of said specimen relative to said second means about an axis parallel to an axis passing through one of said specimen and second means.

18. An apparatus according to claim 9, wherein said fourth means comprises first and second X-rays detectors, displaceable disposed at first and second positions relative to said specimen, for detecting the diffracted X-rays therefrom.

19. An apparatus according to claim 18, wherein said third means comprises a first pulse motor and a first sine bar mechanism coupled between said first means and said first pulse motor, for effecting the rotation of said first means and in response to the output of said first pulse motor.

20. An apparatus according to claim 19, further including means for recording the outputs of said first and second X-ray detectors and the output of said first pulse motor.

21. An apparatus according to claim 16, further including means for rotatably supporting said standard crystal relative to an axis parallel to an axis passing through said specimen.

22. An apparatus according to claim 21, wherein said fourth means comprises first and second X-ray detectors, displaceably disposed at first and second positions relative to said specimen, for detecting the diffracted X-rays therefrom.

23. An apparatus according to claim 22, wherein said third means comprises a first pulse motor and a first sine bar mechanism coupled between said first means and said first pulse motor, for effecting the rotation of said first means and in response to the output of said first pulse motor.

24. An apparatus according to claim 23, further including means for recording the outputs of said first and second X-ray detectors and the output of said first pulse motor.

25. An apparatus according to claim 24, further including a goniometer head for supporting said standard crystal and a second sine bar mechanism and an second pulse motor coupled thereto for effecting rotation of said standard crystal goniometer head.

26. An apparatus according to claim 10, wherein said X-ray detectors are mounted on a gliding table for effecting adjustable positioning thereof.

27. An apparatus according to claim 15, wherein said X-ray detectors are mounted on gliding table means for effecting adjustable positioning thereof.

28. An apparatus according to claim 19, wherein said first means comprises a goniometer head on which said specimen is supported and to which said first sine bar mechanism is coupled.

* * * * *